Oct. 17, 1967        C. N. HIGH ETAL        3,347,103
                      VELOCITY SENSOR
Filed Nov. 27, 1964                    2 Sheets-Sheet 1
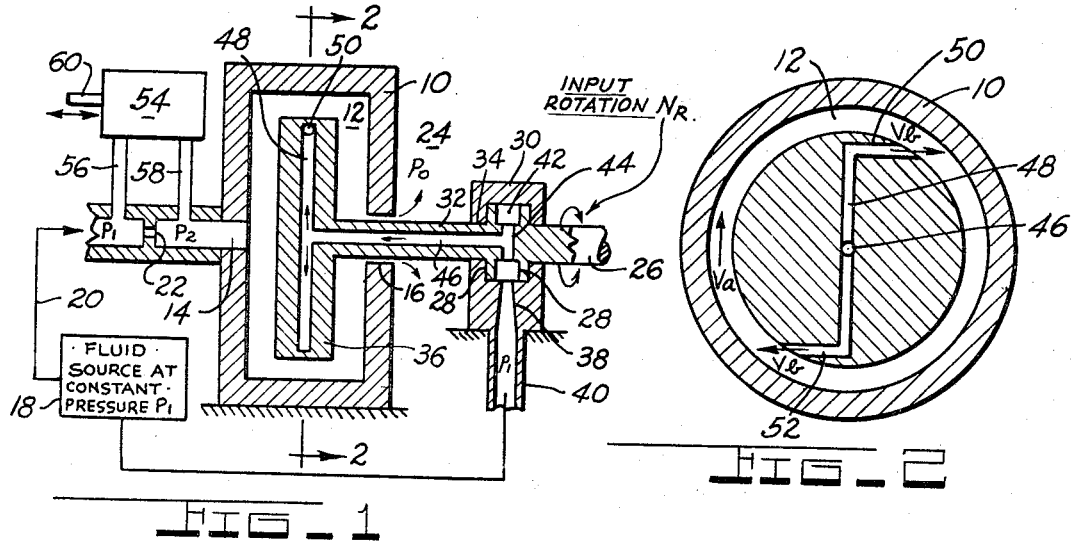
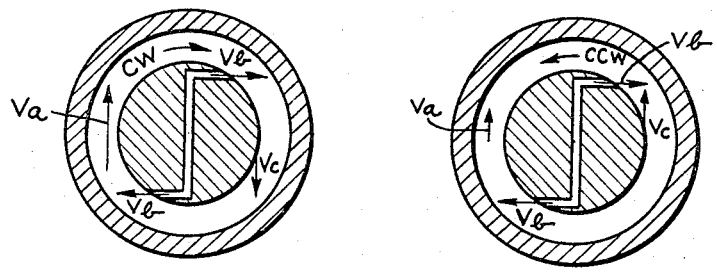
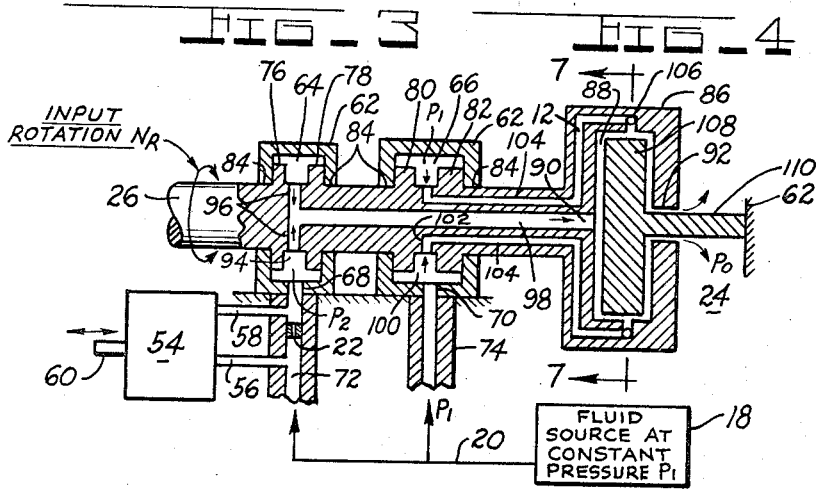
INVENTORS
CHARLES N. HIGH.
GEORGE R. HOWLAND.
BY
    Gordon N. Cheney
              AGENT.

Oct. 17, 1967
C. N. HIGH ET AL  3,347,103
VELOCITY SENSOR
Filed Nov. 27, 1964
2 Sheets-Sheet 2
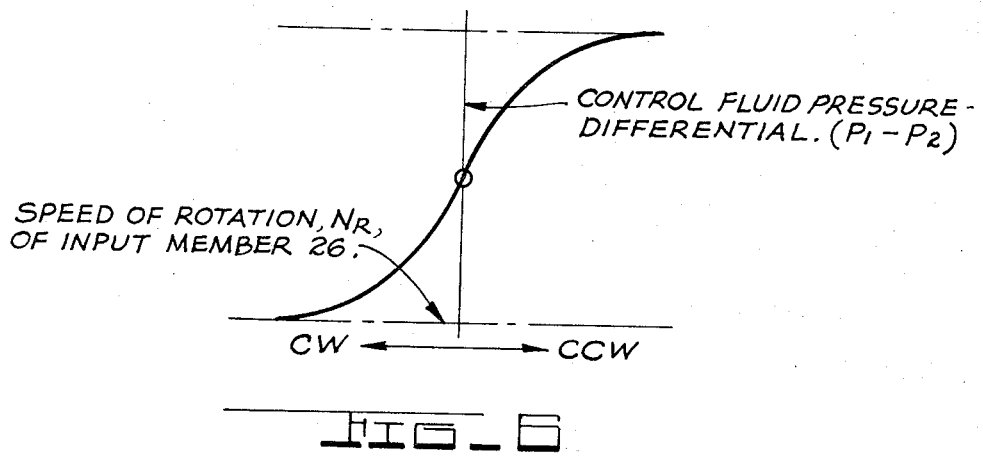
FIG_6
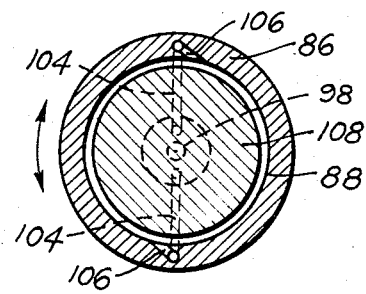
FIG_7
INVENTORS
CHARLES N. HIGH.
GEORGE R. HOWLAND.
BY
*Gordon H. Chevez*
AGENT.

United States Patent Office 3,347,103
Patented Oct. 17, 1967

3,347,103
VELOCITY SENSOR
Charles N. High and George R. Howland, South Bend, Ind., assignors to The Bendix Corporation, a corporation of Delaware
Filed Nov. 27, 1964, Ser. No. 414,088
8 Claims. (Cl. 73—502)

The present invention relates, in general, to velocity sensing apparatus and, in particular to a pure fluid vortex type velocity sensor for providing an output signal which varies as a function of an input velocity signal.

It is an object of the present invention to provide a reliable relatively simple and straightforward velocity sensing device wherein a variable rotational input motion is converted to a corresponding variable output fluid pressure signal.

It is another object of the present invention to provide a pure fluid velocity sensing device for converting an input rotational velocity signal to an output fluid pressure signal.

It is a further object of the present invention to provide a velocity sensing device which, with the exception of a rotational input member, requires no moving parts to convert a variable input velocity signal to a corresponding variable output fluid pressure signal.

Other objects and advantages of the present invention will be apparent to those persons skilled in the art from the following description and drawings wherein:

FIGURE 1 is a schematic representation in cross sectional view of the present invention;

FIGURE 2 is a cross sectional view taken on line 2—2 of FIGURE 1;

FIGURE 3 is a cross sectional view similar to FIGURE 2 with vectors shown for one condition of operation;

FIGURE 4 is a cross sectional view similar to FIGURE 3 with vectors shown for another condition of operation;

FIGURE 5 is a schematic representation in cross section of a modified form of the present invention;

FIGURE 6 is a curve showing the relationship between input rotational speed, $N_R$, and output fluid pressure differential, $P_1-P_2$;

FIGURE 7 is a cross sectional view taken on line 7—7 of FIGURE 5.

Referring to FIGURE 1, numeral 10 designates a fixed casing which defines a chamber 12 circular in cross section and provided with a fluid inlet 14 in one wall thereof and a fluid outlet 16 in the opposite wall thereof. A source of fluid 18 at constant pressure $P_1$ is connected via conduit 20 to the inlet 14. Conduit 20 has a restriction 22, which may or may not be adjustable as desired, secured therein across which a fluid pressure differential $P_1-P_2$ is generated. Fluid flows from inlet 14 through chamber 12 and exhausts through outlet 16 to a fluid pressure source 24 which in the present embodiment is to be considered the asmosphere at pressure $P_0$ but which may be any suitable relatively low pressure source. In the event that the fluid is a liquid, it will be understood that the fluid circuit may be closed by providing a return conduit, not shown, from outlet 16 to source 18 assuming source 18 includes a relatively low pressure sump.

A rotatable input member 26 suitably connected by any suitable driving means, not shown, to be rotated by mechanism, not shown, the speed of which, $N_R$, is desired to be measured is provided with spaced apart circular flange portions or slip rings 28 which bear against the walls of a circular member 30 in casing 10 thereby providing a seal against fluid flow from chamber 30. A tubular extension 32 of input member 26 extends through and is journalled for rotation in an opening 34 in a wall of chamber 30 and through outlet 16 into chamber 12 where the extension 32 terminates in an enlarged diameter portion 36. The clearance between tubular extension 32 and the peripheral surface of outlet 16 is selected to provide the major restriction to flow of fluid from conduit 20 at pressure $P_1$ to low pressure source 24. An inlet port 38 formed in the radially outermost wall of chamber 30 is connected to the fluid source 18 via a conduit 40. The fluid at pressure $P_1$ flows from inlet port 38 through an annulus 42 defined by circular portions 28 to a radial passage 44 in input member 26 then through axial passage 46 in tubular extension 32 to a diametrically extending passage 48 in enlarged diameter portion 36 which passage 48 terminates in oppositely extending passages 50 and 52 perpendicular thereto through which fluid exhausts to chamber 12.

The passages 50 and 52 may extend transversely to the axis of enlarged diameter portion 36 as shown. As an alternate arrangement, not shown, passages 50 and 52 may be formed in enlarged diameter portion 36 at a right angle to that of passages 50 and 52 of FIGURE 2 such that the passages 50 and 52 extend parallel to the axis of enlarged diameter portion 36 thereby exhausting fluid into chamber 12 from the side wall of the enlarged diameter portion 36. It will be understood that only one of the passages 50 or 52 is essential for the intended operation of applicant's device. If desired, additional diametrically extending passages 48 as well as associated additional passages 50 and 52 may be provided.

Pressure responsive control mechanism 54 connected to conduit 20 upstream and downstream of restriction 22 via passages 56 and 58, respectively, responds to the fluid pressure differential $P_1-P_2$ across restriction 22 which pressure differential varies as a function of the speed of rotation, $N_R$, of input member 26 in a manner to be described. The response of control mechanism 54 to the pressure differential $P_1-P_2$ is converted to a useable output signal for control purposes as, for example, a position signal via output member 60.

Referring now to FIGURE 5 which illustrates a modified form of the above described mechanism, structure similar to that of FIGURE 1 is identified by like numerals. The significant difference in the modified form of FIGURE 5 is that the casing which defines chamber 12 is connected to the rotatable input member 26 and rotated thereby whereas in FIGURE 1 the casing which defines chamber 12 is fixed and the enlarged diameter portion 36 contained by chamber 12 is connected to and rotated by the input member 26.

Numeral 62 designates a fixed casing which defines chambers 64 and 66 circular in cross section and provided with fluid inlet ports 68 and 70, respectively, in the radially outermost walls thereof. The conduit 20 containing restriction 22 connects fluid source 18 with the inlet port 68. A conduit 74 connects conduit 72 upstream from restriction 22 with inlet port 70. The rotatable input member 26 is provided with spaced apart circular flange portions or slip rings 76 and 78 which bear against opposite walls of chamber 64 and similar flange portions or slip rings 80 and 82 which bear against opposite walls of chamber 66. The input member 26 extends through and is suitably journalled for rotation in openings 84 in the respective walls of chambers 64 and 66. The input member 26 terminates in enlarged diameter portion 86 which defines a circular chamber 88 having inlet and outlet ports, 90 and 92, respectively, coaxially therewith.

Fluid at pressure $P_1$ passes through conduit 72 to restriction 22 where a pressure drop to $P_2$ occurs then through inlet port 68 and annulus 94, radial passages 96 and axial passage 98 formed in input member 26 and inlet port 90 to chamber 88 from which the fluid exhausts via outlet port 92 to pressure $P_0$.

Fluid at pressure $P_1$ flows through conduit 74 to inlet port 70 then through annulus 100 to radial passages 102 and associated passages 104 formed in input member 26, each of the latter passages 104 terminating in a passage 106 extending perpendicular thereto and arranged to inject fluid into chamber 88 substantially tangential to the peripheral surface thereof. The passages 106 extend in opposite directions from their respective passages 104 as shown in FIGURE 7. A fixed circular plate 108 disposed in chamber 88 and coaxially therewith is provided with a stem 110 which extends through outlet port 92 and which is fixed to casing 62.

As in the case of passages 50 and 52 of FIGURE 1, an alternate arrangement of passages 106 is suggested wherein the passages 106 may extend parallel to the axis of input member 26 in which case the fluid would be injected into chamber 12 from either or both end walls of chamber 12.

As in the case of FIGURE 1, the pressure differential $P_1-P_2$ across restriction 22 is sensed by control mechanism 54 which provides an output signal as a function of the pressure differential $P_1-P_2$.

*Operation of FIGURE 1*

The present invention operates on the principle of swirl or vortex flow control. The fluid passing through chamber 12 experiences swirling motion in response to the control fluid injected into chamber 12 from passages 50 and 52, the rotational component of motion imposed on the fluid flow through chamber 12 depending upon the direction and rate of rotation of the input member 26 relative to the fixed casing 10. For example, as a result of increasing the vortex or swirling motion of the fluid, the weight flow rate of fluid through inlet port 14 is reduced which, in turn, results in a corresponding increase in the fluid pressure $P_2$ on the downstream side of restriction 22 whereas a decrease in the vortex or swirling motion of the fluid results in an increase in the weight flow rate through inlet port 14 and a corresponding decrease in fluid pressure $P_2$. It is apparent therefore that, with pressure $P_1$ held constant, the fluid pressure differential $P_1-P_2$ across restriction 22 will vary in a predetermined manner as a result of variations in pressure $P_2$ resulting from the abovementioned variable vortex or swirl flow generated as a function of the direction and magnitude of rotational velocity of the input member 26.

Referring to FIGURE 2, it will be assumed that the input member 26 is stationary i.e., its rotational velocity is zero. Fluid injected by passages 50 and 52 into chamber 12 at a velocity $V_b$ impinges against the curved wall of chamber 12 and is deflected along the curved surface thereof in a clockwise direction as viewed in FIGURE 2. The fluid flow entering chamber 12 from inlet port 14 flows radially outwardly in chamber 12 and passes through the annular flow passage defined by the casing 10 and radially outermost surface of enlarged diameter portion 36. The fluid flow from inlet port 14 encounters the swirling mass of fluid generated by fluid injected by passages 50 and 52 to the annular flow passage and acquires a corresponding swirling motion. The resulting combined mass flow of fluid has a tangential component of the swirl velocity the magnitude and direction of which is represented by vector $V_a$. As the mass of fluid flows toward outlet port 16, the flow pattern is in the form of a spiral or vortex which results in amplification of the tangential velocity $V_a$ and a corresponding impedance to flow through chamber 12. The swirl velocity determines the weight flow rate of fluid through chamber 12 which, in turn, establishes a corresponding fluid pressure $P_2$ and thus pressure differential $P_1-P_2$ across restriction 22.

Referring to FIGURE 3, it will be assumed that the input member 26 is rotating clockwise at a speed represented by tangential velocity vector $V_c$. The resultant increase in the tangential component of the swirl velocity as represented by vector $V_a$ over that of FIGURE 2 results in a decrease in fluid flow through inlet port 14 and a corresponding increase in pressure $P_2$ which, in turn, results in a reduced pressure differential $P_1-P_2$ across restriction 22.

Referring to FIGURE 4, it will be assumed that the input member 26 is rotating in the opposite direction from FIGURE 3, i.e., in a counterclockwise direction as viewed in FIGURE 4. The tangential velocity of input member 26 is represented by vector $V_c$ which results in a decrease in the tangential component of the swirl velocity as represented by vector $V_a$ and a corresponding increase in flow through inlet port 14 which, in turn, results in a decrease in pressure $P_2$ and a corresponding increase in pressure differential $P_1-P_2$ across restriction 22. As a result of the abovementioned control over the swirl velocity of fluid flow through chamber 12, it will be recognized that the fluid pressure differential $P_1-P_2$ can be controlled as a predetermined function of the rate of rotation of input member 26. The pressure differential $P_1-P_2$, in turn, is sensed by the mechanism 54 which may convert the sensed pressure differential $P_1-P_2$ to a resultant output signal which varies as a predetermined function of the rate of rotation of input member 26.

*Operation of FIGURE 5*

In the embodiment of FIGURE 5, fluid enters chamber 88 from inlet port 90 and passes radially outwardly in chamber 88 to the annular flow passage defined by the radially inner most surface of casing 86 and the radially outermost surface of plate 108. As in the case of FIGURE 1, the fluid flow acquires swirl motion as a result of encountering the swirling mass of fluid which, in the case of FIGURE 5, is generated by the fluid injected from passages 106 to the adjacent annular flow passage. The resulting mass flow then passes out of chamber 88 via outlet port 92.

FIGURES 2, 3 and 4 heretofore described in connection with FIGURE 1 are valid in the case of FIGURE 5 for the same assumed conditions of rotation of the input member 26.

FIGURE 6 illustrates in general the relationship between speed of rotation, $N_R$, of input member 26 and the fluid pressure differential $P_1-P_2$ generated across restriction 22. The clockwise (cw.) and counterclockwise (ccw.) directions of rotation indicated in FIGURE 6 are related to the rotatable input member 26 as viewed in FIGURES 2, 3 and 4.

It will be understod that various modifications of the structure shown and described heretofore may be made by those persons skilled in the art without departing from the scope of applicants' invention. It is assumed that various suitable fluid seals not shown or described may be provided where required to guard against fluid leakage. It will be understood by those skilled in the art that the output fluid pressure differential signal $P_1-P_2$ generated across restriction 22 is but one form of useful output signal. If desired, the restriction 22 may be deleted and a conventional flowmeter substituted therefor, in which case both pressures $P_1$ and $P_0$ should be maintained constant.

The flowmeter would provide an output signal which varies in accordance with the flow rate therethrough which flow rate is a function of the direction and magnitude of rotational velocity of input member 26 in the aforementioned manner.

We claim:

1. Velocity sensing apparatus for measuring the velocity of a rotating member comprising:

a swirl chamber having a fluid inlet and a fluid outlet;

a source of pressurized fluid;

a conduit connected to supply pressurized fluid from said source to said inlet;

said fluid outlet being connected to a relatively low pressure fluid source;

a restriction in said conduit;

rotatable means including passage means connected to receive a pressurized fluid and discharge the same into said chamber to generate a control fluid swirl therein which varies in absolute velocity as a function of the speed of said rotatable means;

said rotatable means being connected to and driven by the rotating member the velocity of which is to be measured;

said control fluid swirl being imposed upon the flow of fluid passing through said chamber from said inlet to said outlet causing the same to acquire a corresponding swirling motion in said chamber with the rate of flow through said restriction and thus the fluid pressure differential across said restriction varying accordingly; and means responsive to the fluid pressure differential across said restriction.

2. Velocity sensing apparatus for measuring the velocity of a rotating member comprising:

a circular swirl chamber having a fluid inlet and a fluid outlet;

a source of pressurized fluid;

a conduit connected to supply pressurized fluid from said source to said inlet;

said fluid outlet being connected to a relatively low pressure fluid source;

a restriction in said conduit across which the fluid pressure differential varies as a function of the rate of fluid flow through said restriction;

rotatable means including passage means connected to receive a pressurized fluid at constant pressure and discharge the same into said chamber to generate a control fluid swirl therein which varies in velocity as a function of the velocity of said rotatable means;

said flow of pressurized fluid from said inlet being subjected to said control fluid swirl and acquiring a corresponding swirling motion in said chamber before passing through said outlet;

said rate of fluid flow through said restriction and thus said fluid pressure differential varying in accordance with the swirl velocity of said fluid; and means responsive to said fluid pressure differential across said restriction.

3. Velocity sensing apparatus as claimed in claim 1 wherein:

said swirl chamber is defined by a fixed casing and is circular in cross section; and said rotatable means includes a circular member supported for rotation in said chamber with the adjacent peripheral surfaces of said circular member and said chamber in spaced apart relationship to define an annular flow passage;

said circular member being provided with spaced apart oppositely extending passages vented to the peripheral surface of said circular member from which pressurized fluid is discharged into said annular flow passage to thereby generate said control fluid swirl.

4. Velocity sensing apparatus as claimed in claim 1 wherein:

said swirl chamber is defined by a fixed casing and is circular in cross section with spaced apart end walls, one of which walls has said fluid inlet formed therein and the other wall having said fluid outlet formed therein;

said fluid inlet and fluid outlet are coaxially located with respect to the axis of said circular chamber;

said rotatable means includes a circular member supported for rotation in said circular chamber with the radially outermost surface thereof in spaced apart relationship relative to the adjacent surface of said casing to define an annular flow passage through which fluid from said inlet must pass to reach said outlet; and said circular member is provided with spaced apart oppositely extending passages vented to the peripheral surface of said circular member from which pressurized fluid is discharged into said annular flow passage to thereby generate said control fluid swirl.

5. Velocity sensing apparatus as claimed in claim 1 wherein:

said swirl chamber is defined by a fixed casing and is circular in cross section;

said rotatable means includes a shaft portion terminating in an enlarged diameter portion, the shaft portion being rotatably supported by said casing and coaxial with said chamber and the enlarged diameter portion being contained by said chamber;

said passage means including an axial passage in said shaft portion, radially extending passages in said enlarged diameter portion and a passage extending substantially at right angles from each of said radially extending passages into open communication with the peripheral surface of said enlarged diameter portion.

6. Velocity sensing apparatus as claimed in claim 1 wherein:

said swirl chamber is circular in cross section and defined by a casing forming part of said rotatable means;

a fixed circular member about which said casing rotates is disposed in said chamber;

said fixed circular member and said casing defines an annular flow passage wherein said control fluid swirl is generated;

said passage means includes a passage formed in said casing radially outwardly from said fixed circular member and extending inwardly with its axis substantially tangential to said fixed circular member into open communication with said annular flow passage;

said passage discharging pressurized fluid into said annular flow passage to thereby generate said control fluid swirl.

7. Velocity sensing apparatus as claimed in claim 1 wherein:

said swirl chamber is circular in cross section and is defined by a casing forming part of said rotatable means;

a fixed circular member about which said casing rotates is disposed in said chamber and which together with said casing defines an annular flow passage wherein said control fluid swirl is generated;

said passage means includes diametrically opposed first and second passages formed in said casing radially outwardly from said fixed circular member and extending inwardly with the respective axis thereof substantially tangential to said fixed circular member;

said first and second passages extending into open communication with said annular flow passage and discharging pressurized fluid therein to generate said control fluid swirl.

8. Velocity sensing apparatus as claimed in claim 1 wherein:

said passage means is connected to said source of pressurized fluid which is at a constant pressure.

References Cited

UNITED STATES PATENTS

| 2,660,886 | 12/1953 | Milmore | 73—502 X |
| 3,233,522 | 2/1966 | Stern | 73—521 X |
| 3,276,259 | 10/1966 | Bowlers et al. | 73—505 X |

FOREIGN PATENTS

| 1,129,758 | 10/1956 | France. |

JAMES J. GILL, *Primary Examiner.*